US010506412B2

(12) United States Patent
Maheshwari et al.

(10) Patent No.: US 10,506,412 B2
(45) Date of Patent: Dec. 10, 2019

(54) METHODS AND SYSTEMS FOR A CONNECTED BUILDING EMERGENCY SERVICE

(71) Applicant: QUALCOMM Incorporated, San Diego, CA (US)

(72) Inventors: Ankit Maheshwari, Hyderabad (IN); Stephen William Edge, Escondido, CA (US); Atul Soni, Hyderabad (IN); Rimal Patel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/872,225

(22) Filed: Jan. 16, 2018

(65) Prior Publication Data

US 2019/0222993 A1 Jul. 18, 2019

(51) Int. Cl.
H04W 4/02 (2018.01)
G08B 29/18 (2006.01)
H04M 3/51 (2006.01)
H04L 29/06 (2006.01)
H04W 4/90 (2018.01)
H04M 11/04 (2006.01)
G08B 25/10 (2006.01)

(52) U.S. Cl.
CPC ............ *H04W 4/90* (2018.02); *G08B 29/185* (2013.01); *H04M 3/5116* (2013.01); *H04M 11/04* (2013.01); *H04W 4/023* (2013.01); *G08B 25/10* (2013.01); *H04L 67/42* (2013.01); *H04W 4/027* (2013.01)

(58) Field of Classification Search
CPC ....... H04W 4/90; H04W 4/023; H04W 4/027; H04M 11/04; H04M 3/5116; G08B 29/185; G08B 25/10; H04L 67/42
See application file for complete search history.

(56) References Cited

U.S. PATENT DOCUMENTS

| 6,745,021 | B1 * | 6/2004 | Stevens | H04M 3/42 |
| | | | | 455/404.1 |
| 8,483,651 | B1 * | 7/2013 | Zamora | H04M 11/04 |
| | | | | 455/404.1 |
| 9,659,484 | B1 * | 5/2017 | Mehta | H04W 4/90 |
| 2007/0293240 | A1 | 12/2007 | Drennan | |
| 2008/0310599 | A1 | 12/2008 | Purnadi et al. | |
| 2011/0071880 | A1 | 3/2011 | Spector | |
| 2011/0142207 | A1 | 6/2011 | Goldman et al. | |
| 2011/0319051 | A1 | 12/2011 | Reitnour | |
| 2012/0218102 | A1 | 8/2012 | Bivens et al. | |
| 2014/0364081 | A1 * | 12/2014 | Rauner | H04L 12/1895 |
| | | | | 455/404.2 |

(Continued)

*Primary Examiner* — Joseph E Dean, Jr.
(74) *Attorney, Agent, or Firm* — Hunter Clark PLLC

(57) ABSTRACT

A method of supporting emergency services at a server includes: detecting an emergency condition; sending a first notification of the emergency condition to at least one mobile device; determining information for the at least one mobile device; determining a requirement to notify an emergency service provider based, at least in part, on the information for the at least one mobile device; and sending a second notification of the emergency condition to the emergency service provider in response to the requirement to notify the emergency service provider being determined.

12 Claims, 5 Drawing Sheets

(56) References Cited

U.S. PATENT DOCUMENTS

| | | | |
|---|---|---|---|
| 2015/0147997 A1* | 5/2015 | Shaw | H04W 4/90 455/404.2 |
| 2015/0358795 A1 | 12/2015 | You et al. | |
| 2015/0365246 A1* | 12/2015 | Kane | H04L 12/1895 709/203 |
| 2016/0353266 A1 | 12/2016 | Winkler et al. | |
| 2017/0004427 A1 | 1/2017 | Bruchal et al. | |
| 2017/0094490 A1 | 3/2017 | Ryan et al. | |
| 2017/0099579 A1 | 4/2017 | Ryan et al. | |
| 2017/0188216 A1* | 6/2017 | Koskas | H04W 4/90 |

* cited by examiner

METHODS AND SYSTEMS FOR A CONNECTED BUILDING EMERGENCY SERVICE

BACKGROUND

Various buildings such as office buildings or homes may be equipped with emergency detection systems. These systems may be able to detect various emergency situations such as a fire, carbon monoxide, flooding, unauthorized entry, medical alerts (e.g., from a medical monitoring device), etc., or imminent occurrence of any of these. These systems may raise a local alarm (e.g., using a siren or loudspeaker system) and/or may automatically notify an emergency service provider such as a fire department, local police, and/or a medical response service, etc. However, such systems may be susceptible to raising false or unnecessary alarms (e.g., such as when a smoke detector confuses cigarette smoke with smoke from a fire or when a small fire starts in a building that is quickly put out by people on site), which may create cost and inconvenience to emergency services providers. In addition, there may be extra delay in obtaining a response from emergency services providers in a real emergency when an emergency detection system employs detection thresholds that are set too high in an effort to cut down on false and unnecessary alarms.

SUMMARY

An example method of supporting emergency services at a server includes: detecting an emergency condition; sending a first notification of the emergency condition to at least one mobile device; determining information for the at least one mobile device; determining a requirement to notify an emergency service provider based, at least in part, on the information for the at least one mobile device; and sending a second notification of the emergency condition to the emergency service provider in response to the requirement to notify the emergency service provider being determined. Implementations of such a method may include one or more of the following features. The information comprises location information comprising: a current location of the at least one mobile device, a future location of the at least one mobile device, a past location of the at least one mobile device, a speed of the at least one mobile device, a velocity of the at least one mobile device, a direction of movement of the at least one mobile device, or an expected time of arrival of the at least one mobile device at a known location, or a combination thereof. The method further includes receiving a response from a user of the at least one mobile device, wherein the information comprises the response. The requirement to notify the emergency service provider is determined by the at least one mobile device or the user of the at least one mobile device, or a combination thereof, and wherein the response comprises the requirement to notify the emergency service provider. The method of claim 1, wherein determining the information comprises determining an absence of a response from the at least one mobile device for a threshold interval of time following sending the first notification. The emergency service provider is a public safety answering point (PSAP), and wherein the sending the second notification of the emergency condition to the emergency service provider comprises establishing an emergency call with the PSAP. The method further includes determining the at least one mobile device, from among a plurality of mobile devices, based at least in part on the emergency condition. The method further includes determining the emergency service provider based, at least in part, on at least one of the emergency condition or the information for the at least one mobile device. The at least one mobile device, the emergency service provider, or the requirement to notify the emergency service provider, or a combination thereof, is determined based, at least in part, on at least one of a time of day or a day of week. The emergency condition is an emergency condition for a least one of a person, an animal, a home, a building, an office, a factory, a venue, or a vehicle. The emergency condition comprises at least one of a fire, a medical condition, a burglary, or a flood.

An example of a server includes: a transceiver; a processor communicatively coupled to the transceiver and configured to: detect an emergency condition; send, via the transceiver, a first notification of the emergency condition to at least one mobile device; determine information for the at least one mobile device; determine a requirement to notify an emergency service provider based, at least in part, on the information for the at least one mobile device; and send, via the transceiver, a second notification of the emergency condition to the emergency service provider in response to the requirement to notify the emergency service provider being determined.

Implementations of such a server may include one or more of the following features. The information comprises location information comprising: a current location of the at least one mobile device, a future location the at least one mobile device, a past location of the at least one mobile device, a speed of the at least one mobile device, a velocity of the at least one mobile device, a direction of movement of the at least one mobile device, or an expected time of arrival of the at least one mobile device at a known location, or a combination thereof. The processor is further configured to receive, via the transceiver, a response from a user of the at least one mobile device, wherein the information comprises the response. The processor is configured to determine the requirement to notify the emergency service provider by analyzing the response. The processor is configured to determine the information for the mobile device by determining that a threshold interval of time has passed since the processor sent the first notification without the processor receiving a response from the at least one mobile device. The emergency service provider is a public safety answering point (PSAP), and wherein to send the second notification of the emergency condition to the emergency service provider the processor is configured to establish, via the transceiver, an emergency call with the PSAP. The processor is configured to determine the at least one mobile device, from among a plurality of mobile devices, based at least in part on the emergency condition. The processor is configured to determine the emergency service provider based, at least in part, on at least one of the emergency condition or the information for the at least one mobile device. The processor is configured to determine the at least one mobile device, the emergency service provider, or the requirement to notify the emergency service provider, or a combination thereof, based, at least in part, on at least one of a time of day or a day of week.

Another example of a server includes: means for detecting an emergency condition; means, communicatively coupled to the means for detecting, for sending a first notification of the emergency condition to at least one mobile device; means for determining information for the at least one mobile device; means for determining a requirement to notify an emergency service provider based, at least in part, on the information for the at least one mobile device; and means, communicatively coupled to the means for determining the requirement, for sending a second notification of the emergency condition to the emergency service provider in response to the requirement to notify the emergency service provider being determined.

Implementations of such a server may include one or more of the following features. The information comprises location information comprising: a current location of the at least one mobile device, a future location of the at least one mobile device, a past location of the at least one mobile device, a speed of the at least one mobile device, a velocity of the at least one mobile device, a direction of movement of the at least one mobile device, or an expected time of arrival of the at least one mobile device at a known location, or a combination thereof. The server further includes means for receiving a response from a user of the at least one mobile device, wherein the information comprises the response. The means for determining the requirement to notify the emergency service provider are configured to analyze the response. The means for determining the information for the mobile device comprise means for determining an absence of a response from the at least one mobile device for a threshold interval of time following sending the first notification. The emergency service provider is a public safety answering point (PSAP), and wherein the means for sending the second notification of the emergency condition to the emergency service provider comprise means for establishing an emergency call with the PSAP. The server further includes means, communicatively coupled to the means for sending the first notification, for determining the at least one mobile device, from among a plurality of mobile devices, based at least in part on the emergency condition. The server further includes means, communicatively coupled to the means for sending the second notification, for determining the emergency service provider based, at least in part, on at least one of the emergency condition or the information for the at least one mobile device. The server further includes means for determining the at least one mobile device, the emergency service provider, or the requirement to notify the emergency service provider, or a combination thereof, based, at least in part, on at least one of a time of day or a day of week.

An example of a method of supporting emergency services by a user equipment (UE) includes: receiving, by the UE from a server, a first notification of an emergency condition; determining, by the UE, information regarding whether to notify an emergency service provider by the server; and sending the information to the server from the UE.

Implementations of such a method may include one or more of the following features. The information comprises location information for the mobile device. The location information comprises at least one of a current location of the mobile device, a future location of the mobile device, a past location of the mobile device, a speed of the mobile device, a velocity of the mobile device, a direction of movement of the mobile device, or an expected time of arrival of the mobile device at a known location. The information comprises a requirement for notifying the emergency service provider. The method further includes: providing a second notification of the emergency condition, based on the first notification of the emergency condition, to a user of the mobile device; and receiving a response from the user, wherein the information is based, at least in part, on the response.

DETAILED DESCRIPTION

Figure 1:
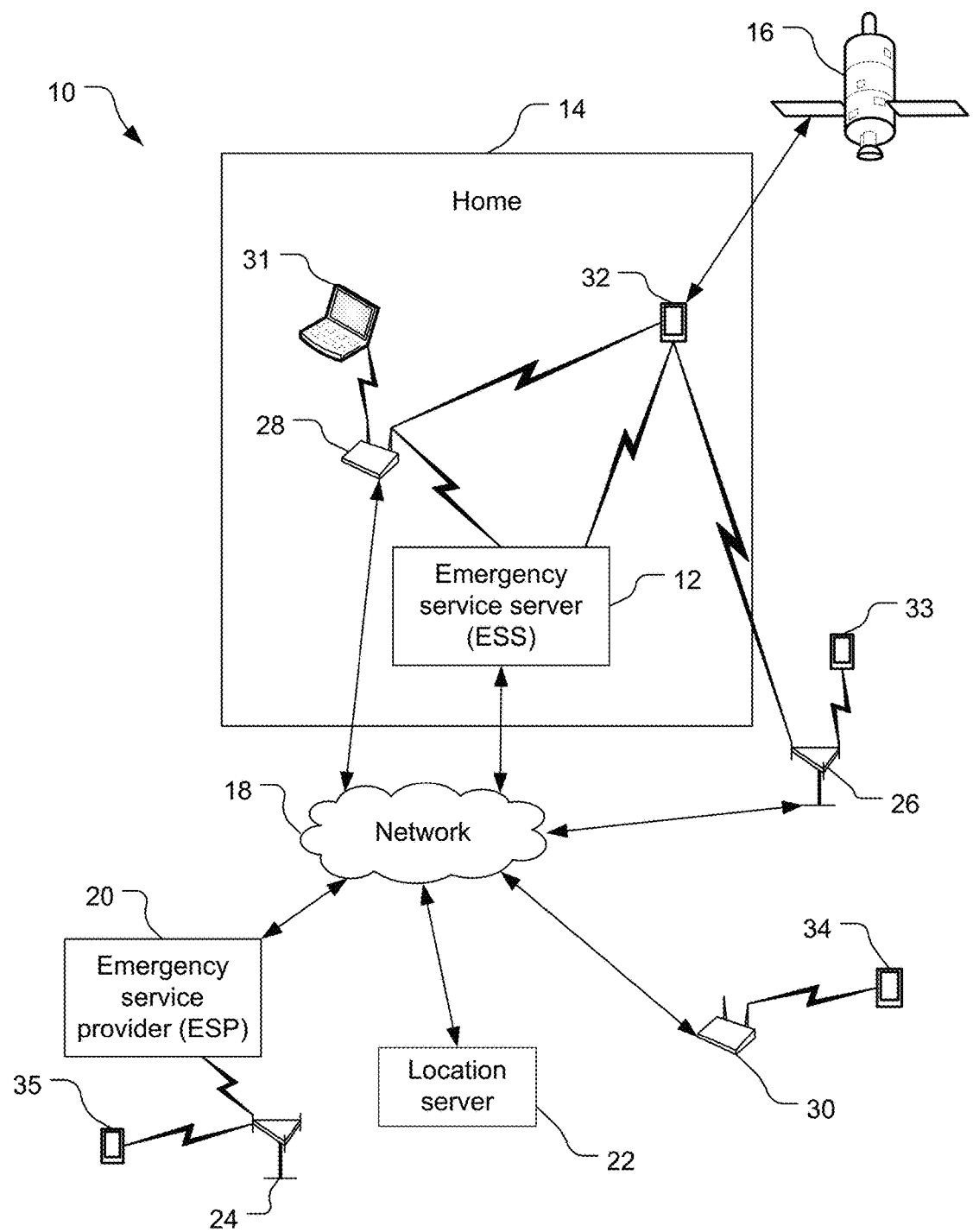
FIG. 1 is a simplified diagram of an example of a connected building emergency service architecture.

Techniques are discussed for obtaining emergency service for a connected building such as an office building or a home that has an emergency service server (ESS) configured and coupled for communication with one or more emergency service providers. For example, the ESS may detect an emergency (e.g., by sensing an emergency condition and/or by receiving notice of an emergency or emergency condition, etc.). In response to detecting the emergency, the ESS may send a notification to a mobile device such as a user equipment (UE). The UE may provide an alert to a user of the UE of the corresponding emergency condition. The user may reply to the alert, e.g., by indicating that an emergency service provider (ESP) should be contacted, in which case the UE sends an instruction to this effect to the ESS. Alternatively, the user may indicate that the ESP should not be contacted (e.g., if the user determines that the alert is a false alarm or that the user can address the emergency condition, etc.), in which case the UE may send a response to the ESS that the ESP should not be contacted. The ESS may determine that the ESP should be notified, e.g., in response to receiving a response from the UE instructing the ESS to notify the ESP, or in response to no response being received from the UE acceptably quickly (e.g., within a threshold amount of time). The ESS sends a notification to the ESP that appropriate emergency service(s) is (are) desired.

The example discussed above is not exhaustive, and other examples of obtaining emergency service for a connected building may be implemented. For example, multiple UEs may be notified by the ESS in response to the ESS detecting an emergency condition, with the UEs selected based on one or more criteria, e.g., based on a prioritized list of UEs, based on the type of emergency, based on location information related to the UEs, etc. Location information for one or more of the UEs may be obtained through the user plane of the UEs.

User Plane location based service solutions, such as Secure User Plane Location (SUPL) defined by the Open Mobile Alliance (OMA), may employ one or more positioning protocols (e.g., LPP, LPPe, TIA-801, etc.) for positioning. A positioning protocol is a protocol used between a location server (e.g., a SUPL Location Platform (SLP)) and a terminal or other device (e.g., a SUPL Enabled Terminal (SET)) that may support one or more positioning methods that are able to determine or help determining the location of the terminal or device. Examples of positioning protocols include the Long Term Evolution (LTE) Positioning Protocol (LPP) defined in 3GPP Technical Specification (TS) 35.355, LPP Extensions (LPPe) defined in OMA-TS-LPPe-V1_0, OMA-TS-LPPe-V1_1 and OMA-TS-LPPe-V2_0 from OMA, TIA-801 defined in 3GPP2 TS C.S0022, Radio Resource Control (RRC) defined in 3GPP TS 25.331 and TS 36.331 and Radio Resource Location Services (LCS) Protocol (RRLP) defined in 3GPP TS 44.031. These specifications are all publicly available from the Third Generation Partnership Project (3GPP), Third Generation Partnership Project 2 (3GPP2) and OMA as applicable.

LPPe is defined to be used in combination with LPP and the combined protocol may be referred to as LPP/LPPe, LPP+LPPe or simply as LPPe (where combination with LPP is assumed implicitly). Positioning protocols such as LPP and LPPe support a number of different position methods of which some of the principle ones include Assisted Global Navigation Satellite System (A-GNSS), Observed Time Difference of Arrival (OTDOA), Enhanced Cell ID (ECID), Wireless Local Area Network (WLAN) positioning, and positioning based in use of inertial sensors in or attached to a UE.

The techniques described herein may be used in association with devices (e.g., UEs, SETs) that have access to various wireless networks such as Code Division Multiple Access (CDMA) networks, Time Division Multiple Access (TDMA) networks, Frequency Division Multiple Access (FDMA) networks, Orthogonal FDMA (OFDMA) networks, networks supporting a combination of the aforementioned technologies, networks with wireless wide area network (WWAN) coverage and/or wireless local area network (WLAN) coverage, a wireless personal area network (WPAN). A CDMA network may implement one or more radio access technologies (RATs) such as Wideband-CDMA (W-CDMA), cdma2000, and so on. Cdma2000 covers Telecommunications Industry Association (TIA) IS-2000, IS-856, and IS-95 standards. A TDMA network may implement one or more radio technologies such as Global System for Mobile Communications (GSM), Digital Advanced Mobile Phone System (D-AMPS) or some other RAT. D-AMPS covers TIA IS-136 and IS-54 standards. An OFDMA network may implement one or more radio technologies such as Long Term Evolution (LTE), LTE Advanced (LTE-A), or New Radio (NR) also referred to as Fifth Generation (5G). These various radio technologies and standards are known in the art. LTE, LTE-A, W-CDMA, GSM and NR are defined, or are being defined, in documents from 3GPP. Cdma2000 is described in documents from 3GPP2. 3GPP and 3GPP2 documents are publicly available. A WLAN may be an Institute of Electrical and Electronics Engineers (IEEE) 802.11x network, and a WPAN may be a Bluetooth® network, an IEEE 802.15x network, or some other type of network. The techniques may also be implemented in conjunction with any combination of WWAN, WLAN and/or WPAN. The techniques may also be used with a device communicating using a wireline IP capable network such as a network providing Digital Subscriber Line (DSL) or cable access and/or may be used to support client devices communicating using a wireline network.

The techniques may also be used in association with various location solutions such as user plane solutions. A user plane is a mechanism for carrying data for higher-layer applications and employing a user-plane bearer, which is typically implemented with protocols such as User Datagram Protocol (UDP), Transmission Control Protocol (TCP), and Internet Protocol (IP), all of which are known in the art. Messages (e.g., SUPL messages) supporting location services and positioning are carried as part of data in a user plane solution.

Further, while the singular "emergency service" is used herein, this term includes the plural (i.e., "emergency services") as more than one emergency service may be provided. Thus, for example, an emergency service server may detect more than one emergency type and an emergency service provider may provide multiple services for one or more emergency types.

Items and/or techniques described herein may provide one or more of the following capabilities, as well as other capabilities not mentioned. Emergency conditions may be addressed without involving an emergency service provider. False alarms to emergency service providers may be reduced. Human evaluation of emergency conditions may be provided with automated involvement of an emergency service provider provided as a backup. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

FIG. 1 shows an example of an architecture 10 capable of detecting one or more emergencies and providing one or more emergency services. The architecture 10 includes an emergency service server (ESS) 12 disposed in a structure 14, a satellite 16, a network 18, an emergency service provider (ESP) 20, a location server 22, base stations 24, 26, access points (APs) 28, 30, and UEs 31, 32, 33, 34, 35. The structure 14 in the example of FIG. 1 is a home (e.g., a single family residence or an apartment), but the architecture 10 may be used with other structures such as office buildings, shopping malls, hotels, factories, warehouses, stand-alone stores, etc. The structure 14 is a connected structure in that the structure 14 is associated with the ESS 12 that is connected to the network 18 for bi-directional communication of relevant information, e.g., emergency condition information. The UEs 31-35 may also be called mobile stations (MSs), terminals, stations, devices, mobile devices, wireless devices, subscriber units, targets, target SETs, or by some other terminology. The UEs 31-35 may each be a Secure User Plane (SUPL) enabled terminal (SET). A SET is a device capable of communicating with SUPL capable entities (e.g., an SLP) that support positioning and location services for SETs. The UEs 31-35 shown are examples, and other quantities and types of UEs may be included in the architecture 10. Here, the UE 31 is a laptop computer and the UEs 32-35 are smart phones, but the architecture 10 may include one or more personal digital assistants (PDAs), wireless modems, personal computers, telemetry devices, tracking devices, tablets, machine-to-machine (M2M) devices, embedded modems, and so on. For example, the UE 32 may be a UE in a Universal Mobile Telecommunication System (UMTS), an MS in GSM or cdma2000, a personal computer in an IP-based network, and so on.

The satellite 16 in the architecture 10 is part of a Satellite Positioning System (SPS) such as a Global Navigation Satellite System (GNSS). The satellite 16 is configured to provide signals for position determination (e.g., of the UEs 31-35). While only one satellite 16 is shown for simplicity of the figure, more than one satellite 16 will be provided as part of the SPS, and the UEs 31-35 are configured to receive and process signals from multiple satellites. The network 18 is configured to communicate bi-directionally with other components of the architecture 10 and may include more than one network and/or network type. For example, the network 18 may include one or more Radio Access Networks (RANs), which may each be a wireless communication network employing one or more wireless carriers (e.g., LTE and/or NR). The network 18 may include or be connected to one or more wired networks such as one or more terrestrial communication networks (e.g., the Internet).

While only a single network 18 is shown in FIG. 1, the network 18 may comprise multiple wireless and/or wireline networks that are not shown individually in FIG. 1. Although shown separately from the network 18, the base stations 24, 26 and/or the access points 28, 30 may be part of the network 18. The discussion below refers to the UE 32 as an example, but the discussion applies to other UEs including the UEs 31, 33-35.

The ESS 12 in the architecture 10 may be a server, a Personal Computer, part of a home or office security system or in general a computer system with an ability to communicate with the network 18, the UEs 31-35 and the ESP 20 by wireless and/or wireline means. The ESS 12 may include or be connected to one or more sensor devices that enable the ESS 12 to recognize or infer an emergency related condition (e.g., a fire, flood, medical condition for a user, unauthorized incursion into structure 14 etc.). More details of the ESS 12 are provided herein.

The ESP 20 may be a Public Safety Answering Point (PSAP) which responds to emergency calls from users (e.g., "911" calls in North America or "112" calls in Europe) and dispatches a public safety response (e.g., police, fire or ambulance). The ESP 20 may also be a private safety responder such as a home and/or office security service or a medical service provider. The ESP 20 may further comprise more than one public and/or private service provider. The ESP 20 may be connected to the network 18 by wireless and/or wireline means and may be configured to communicate with the ESS 12 and the UEs 31-35.

As discussed herein, the architecture 10 is configured to detect one or more emergency conditions, notify the UEs 31-35, have one or more of the UEs 31-35 respond to the notification, and respond to the UE(s) response(s) or lack thereof by notifying the ESP 20, if appropriate, to obtain appropriate emergency service.

The UEs 31-35 may be associated with the structure 14. For example, the UEs 31-35 may belong to users that live in the structure 14 with the structure 14 being a home as shown. Alternatively, one or more of the UEs 31-35 may be associated with one or more corresponding users that are otherwise associated with the structure 14, e.g., that are employed by a business having a place of business in the structure 14. The association of the UEs 31-35 with the structure 14 may be programmed into the software 44 (described later) for the ESS 12, and may be re-programmed via the user interface 46 (described later) for the ESS 12, for example, to accommodate changes in persons living or working at the structure 14.

The UE 32 may include a SUPL agent which may be an application (App) or other client entity within the UE 32 that may, from time to time, request the location of the UE 32 from the UE 32—e.g., from a positioning engine in the UE 32 (not shown in FIG. 1) that supports SUPL. The UE 32 may be a SET whose position is being sought by a SUPL agent that may be internal to the UE 32 or external to the UE 32. The UE 32 may perform functions such as privacy, security, positioning measurement and position calculation for location services.

The UE 32 is configured to communicate with the network 18 for various services such as originating and/or receiving voice calls, packet data sessions, messaging, and so on. The UE 32 may also communicate with SUPL capable entities via the network 18. The network 18 may include a wireless network such as a cdma2000 network, a UMTS network, an LTE network, a GSM network, an NR (or 5G) network, some other radio access network (RAN), a WLAN, and so on. The network 18 may also or alternatively include a wireline network such as an IP-based network, the Internet, a phone network, a cable network, and so on. The UE 32 may also receive signals from one or more navigation satellites, e.g., the satellite 16, that form all or part of an SPS. The SPS may include or be part of a Global Navigation Satellite System (GNSS) such as the Global Positioning System (GPS), the European Galileo system, the Russian GLONASS system, the Chinese Beidou system or some other satellite positioning system. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS signals, SPS-like signals, and/or other signals associated with such SPS.

The UE 32 may measure signals from satellites and/or from base stations, wireless access points (APs), femtocells, etc. in the network 18 and may obtain pseudo-range measurements for the satellites (e.g., for GNSS or A-GNSS positioning) and/or network measurements (e.g., for OTDOA, ECID and/or WLAN positioning) from the base stations, APs and femtocells. The satellite pseudo-range and/or network measurements may be used to derive a position estimate for the UE 32 which may be computed by the UE 32 or by the location server 22 if the UE 32 sends the measurements to the location server 22.

The location server 22 may be an SLP and may be responsible for SUPL service management and position determination. SUPL service management may include managing locations of SETs (e.g., the UEs 31-35) and storing, extracting, and modifying location information of target SETs. The location server 22 may include a SUPL Location Center (SLC) and a SUPL Positioning Center (SPC). The SLC performs various functions for location services, coordinates the operation of SUPL, and interacts with SETs over a user plane bearer. The SLC may perform functions for privacy, initiation, security, roaming support, charging/billing, service management, position calculation, and so on. The SPC supports positioning for SETs, is responsible for messages and procedures used for position calculation, and supports delivery of assistance data to the SETs to assist SETs in acquiring and measuring signals (e.g., from SPS satellites 20 and/or from base stations and APs in the network 18) and/or to compute a location. The SPC may perform functions for assistance data delivery, retrieval of measurements and/or location estimates from SETs, position calculation, and so on. An SPC may have access to GPS or other GNSS receivers (e.g., located in a reference network, perhaps a global one) and may receive signals for SPS satellites and/or receive data derived from SPS signals from a reference network so that it can provide assistance data to SETs. In some implementations, SLC and SPC may be physically and/or logically combined.

Figure 2:
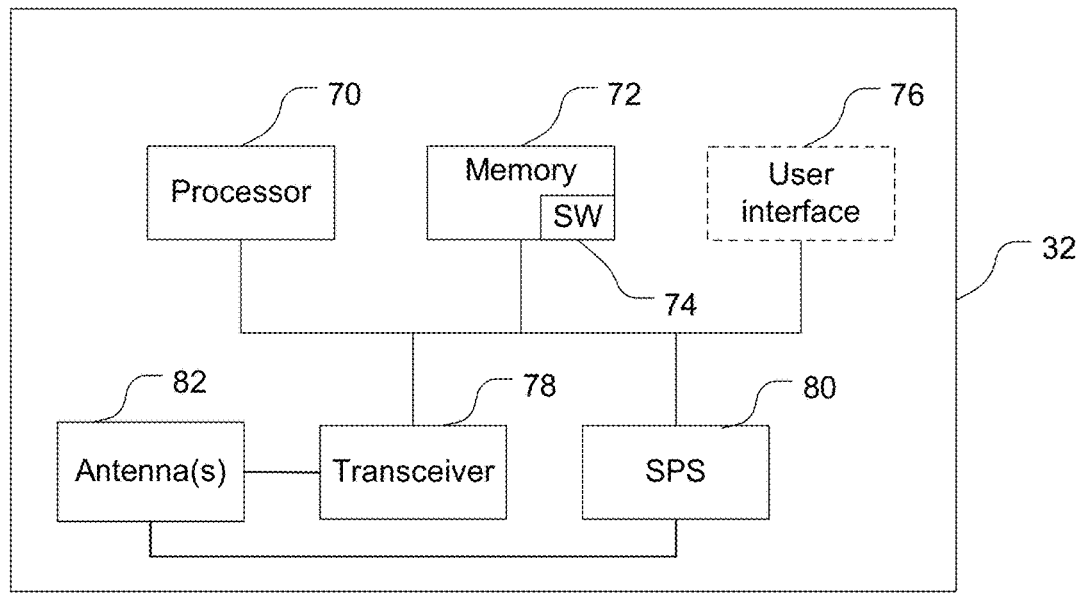
FIG. 2 is a block diagram of portions of an emergency service server shown in FIG. 1.

FIG. 2 shows an example implementation of the UE 32 and may also be an example implementation of the UEs 31 and 33-35. In FIG. 2, the UE 32 comprises a computer system including a processor 70, memory 72 including software (SW) 74, an optional user interface 76, a transceiver 78, antenna(s) 82, and an SPS unit 80. The transceiver 78 is configured to send and receive wireless signals to and from one or more elements in the network 18 via the antenna(s) 82. The processor 70 preferably includes an intelligent hardware device, e.g., a central processing unit (CPU) such as those made or designed by QUALCOMM®, ARM®, Intel® Corporation, or AMD®, a microcontroller, and/or an application specific integrated circuit (ASIC), etc. The processor 70 may comprise multiple separate physical entities that can be distributed in the UE 32. The memory 72 includes random access memory (RAM) and/or read-only memory (ROM). The memory 72 is a non-transitory processor-readable storage medium that stores the software 74 which is processor-readable, processor-executable software code containing processor-readable instructions that are configured to, when executed, cause the processor 70 to perform various functions described herein (although the description may refer only to the processor 70 performing the functions). Alternatively, the software 74 may not be directly executable by the processor 70 but configured to cause the processor 70, e.g., when compiled and executed, to perform the functions. The processor 70 is communicatively coupled to the memory 72, the user interface 76, the transceiver 78, and the SPS unit 80 and is configured to perform a variety of functions, e.g., in accordance with the software 74. For example, the processor 70 and the memory 72 may be configured, as discussed further herein, to receive and process emergency notifications from the ESS, input from a user via the user interface 76, and position signals (e.g., SPS signals and/or indications of positions) from the SPS unit 80.

The SPS unit 80 is configured to acquire and measure signals received from SPS satellites, e.g., the satellite 16. The SPS unit 80 may process SPS signals received via one or more of the antenna(s) 82 to measure code phases or pseudo-ranges and possibly determine the location of the UE 32 from these measurements. Also or alternatively, the SPS unit 80 may provide signal information to the processor 70, e.g., for position determination by the processor 70 and/or provision to the location server 22. The SPS unit 80 may be implemented by the processor 70 and the memory 72, or as a separate entity.

The processor 70 may be configured to determine a location of the UE 32. For example, the processor 70 may analyze signals received from access points and/or base stations in the network 18 (e.g., to determine received signal strength indications (RSSIs) for ECID or WLAN positioning and/or reference signal time difference (RSTD) measurements for OTDOA) and known locations of the access points and/or the base stations (e.g., provided by the location server 22) to determine the location of the UE 32. The processor 70 may use the signals from the access points, the base stations, and/or the satellites to perform trilateration (e.g., which may use three or more measurements) to determine the location of the UE 32. Further, the processor 70 may combine location determination techniques, e.g., averaging or weighted averaging location data from multiple location determination techniques (e.g., using A-GNSS, OTDOA, ECID, etc.), to determine the location of the UE 32.

The network entities in FIG. 1 may also be referred to by other names in other networks and other location architectures. For example, in a 3GPP-based network (e.g., a UMTS network or LTE network), the location server 22 may be called or may correspond to a Gateway Mobile Location Center (GMLC), a Serving Mobile Location Center (SMLC), a standalone SMLC (SAS), an Enhanced SMLC (E-SMLC), a Location Management Function (LMF), a positioning entity, a positioning server, a positioning center, a Position Determining Entity (PDE), a SUPL Positioning Center (SPC), and so on. Also in a 3GPP-based network, a SET may be called a UE, and a SUPL agent may be called an LCS client. The functions and signaling performed by the 3GPP entities may be similar to or the same as those performed by the corresponding SUPL entities, thereby enabling comparable services and capabilities. In some cases, a location server may be called a location center, a SUPL Location Center (SLC), an LCS server, a Mobile Positioning Center (MPC), and so on.

SUPL may support some or all of the following position methods (among others): SET assisted Assisted-GPS (A-GPS); SET assisted Assisted-GNSS (A-GNSS); SET based A-GPS; SET based A-GNSS; Autonomous GPS or autonomous GNSS; Advanced forward link trilateration (A-FLT); SET assisted and/or SET based Enhanced observed time difference (E-OTD); SET assisted and/or SET based Observed time difference of arrival (OTDOA) for UMTS and/or for LTE; SET assisted and/or SET based Enhanced cell/sector (ECID) and cell-ID; SET assisted and/or SET based WiFi positioning (also referred to as WLAN positioning), SET assisted and/or SET based Short Range Node (SRN) positioning and certain SET assisted and/or SET based Hybrid combinations of these.

Figure 3:
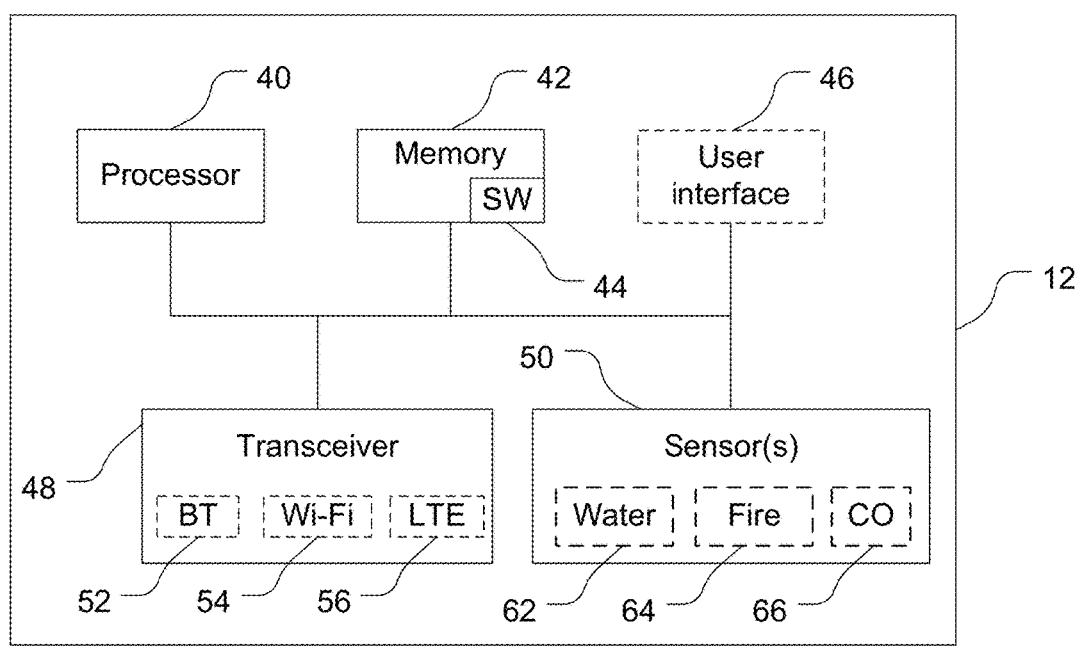
FIG. 3 is a block diagram of portions of a user equipment shown in FIG. 1.

FIG. 3 shows an example of the ESS 12 and comprises a computer system including a processor 40, memory 42 including software (SW) 44, a user interface 46, a transceiver 48, and one or more sensor(s) 50. The user interface 46 is optional, as indicated by the dashed lines. The processor 40 is coupled to the memory 42, the user interface 46, the transceiver 48, and the sensor(s) 50 for bi-directional communication. The transceiver 48 may include or be connected to one or more antennas (not shown in FIG. 3) and may be configured to communicate bi-directionally via wireless means with access points and/or base stations in the network 18, and/or one or more other entities. The transceiver 48 may also be configured to communicate bi-directionally via wireline means with network 18, and/or one or more other entities—e.g., using a packet cable connection or Digital Subscriber Line (DSL) and the Internet. The transceiver 48 optionally includes a BLUETOOTH® unit 52, a Wi-Fi unit 54, and/or an LTE unit 56 each configured (e.g., including one or more appropriate antennas) for wireless bi-directional communication in accordance with a respective protocol. The processor 40 preferably includes an intelligent hardware device, e.g., a central processing unit (CPU) such as those made or designed by QUALCOMM®, ARM®, Intel® Corporation, or AMD®, a microcontroller, and/or an application specific integrated circuit (ASIC), etc. The processor 40 may comprise multiple separate physical entities that can be distributed in the ESS 12. The memory 42 includes random access memory (RAM) and/or read-only memory (ROM). The memory 42 is a non-transitory processor-readable storage medium that stores the software 44 which is processor-readable, processor-executable software code containing processor-readable instructions that are configured to, when executed, cause the processor 40 to perform various functions described herein (although the description may refer only to the processor 40 performing the functions). Alternatively, the software 44 may not be directly executable by the processor 40 but configured to cause the processor 30, e.g., when compiled and executed, to perform the functions. The processor 40 is communicatively coupled to the memory 42 and configured to perform a variety of functions, e.g., in accordance with the software 44. The sensors 50 may be part of the ESS 12 (e.g., within or attached to a physical chassis or enclosure for the ESS 12) or may be remote from the ESS 12 and connected to the ESS 12 by wireless and/or wireline means (e.g., via the transceiver 48).

The sensors 50 may include a sensor 62 to detect the presence of water (e.g., associated with a flood condition), a sensor 64 to detect the presence of fire or smoke (e.g., associated with a fire condition) and a sensor 66 to detect the presence of carbon monoxide (CO) (e.g., associated with natural gas leakage). The sensors 50 may also include medical sensors (not shown in FIG. 3) such as sensors for body temperature, blood pressure, respiration rate, blood sugar level, etc., which may be worn by or implanted in a user and may communicate wirelessly (e.g., using Bluetooth) with the transceiver 48 and possibly via a modem or other wireless device (e.g., a UE) carried or worn by the user.

As discussed herein, the ESS 12 is configured to detect one or more emergency conditions, notify one or more of the UEs 31-35, and notify the ESP 20 as appropriate to obtain emergency service. An emergency condition may be associated with any of a variety of entities, e.g., being an emergency condition for a person, an animal (such as a pet), a building (such as a home, an office, a factory, a venue), or a vehicle, etc. The emergency condition may pertain to any of a variety of types of emergencies such as a fire, a medical condition (e.g., of a person or a pet), a burglary (or other unauthorized entry or attempted entry into the structure 14), a flood, excess carbon monoxide (or other element or chemical), insufficient oxygen, etc.

Figure 4:
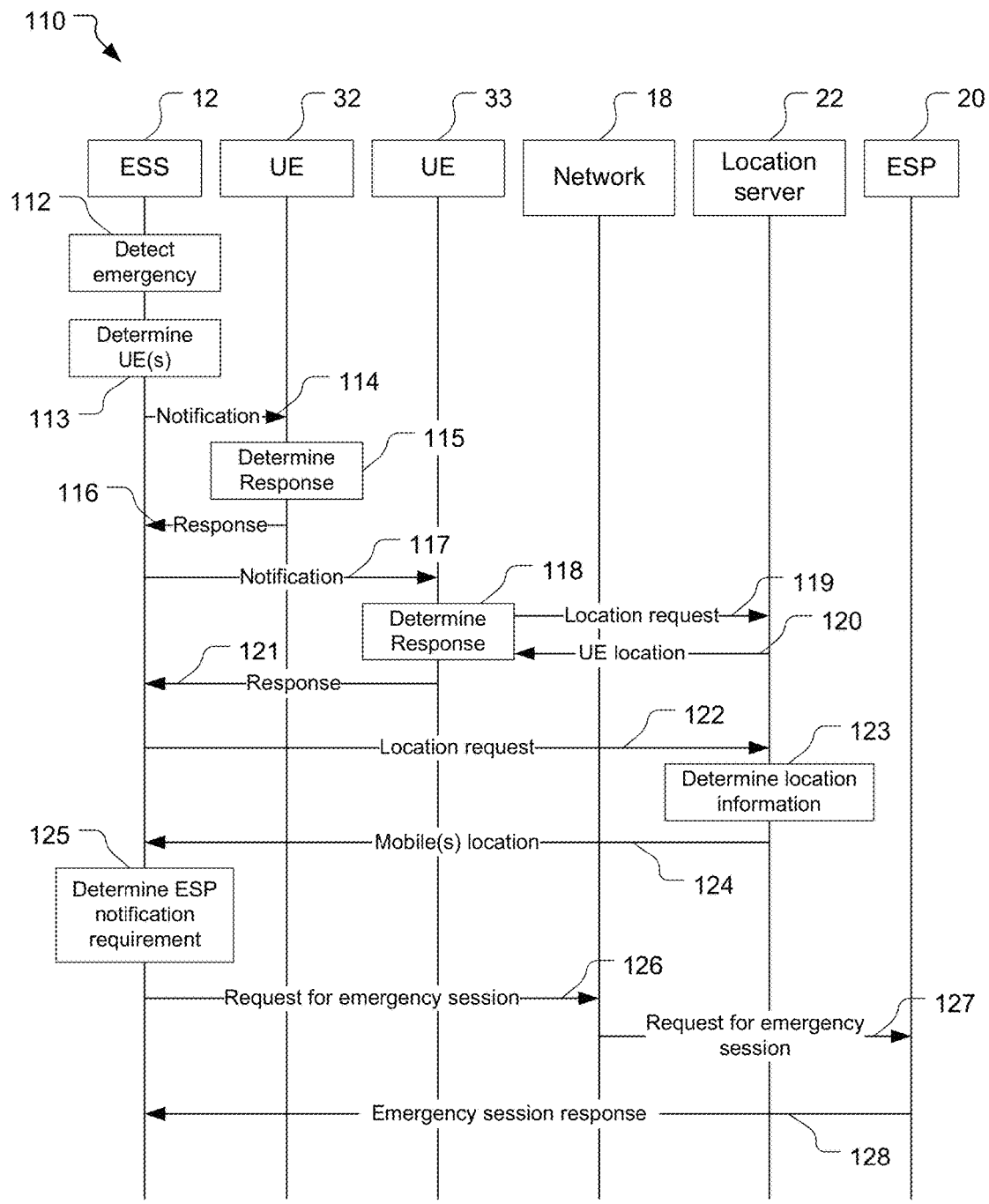
FIG. 4 is a diagram of a signaling flow for emergency service provision.
Figure 5:
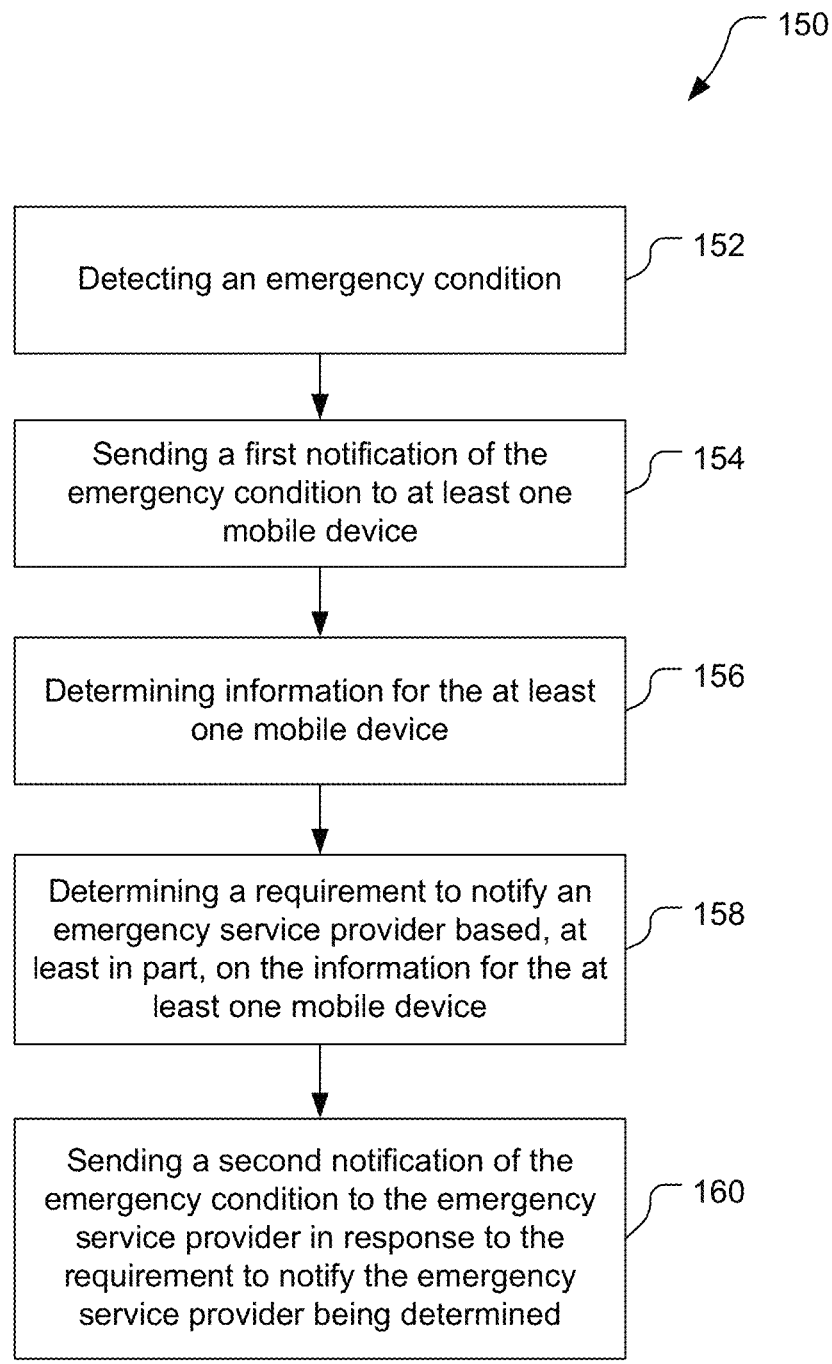
FIG. 5 is a block flow diagram of an example of a method of notifying an emergency service provider of an emergency.
Figure 6:
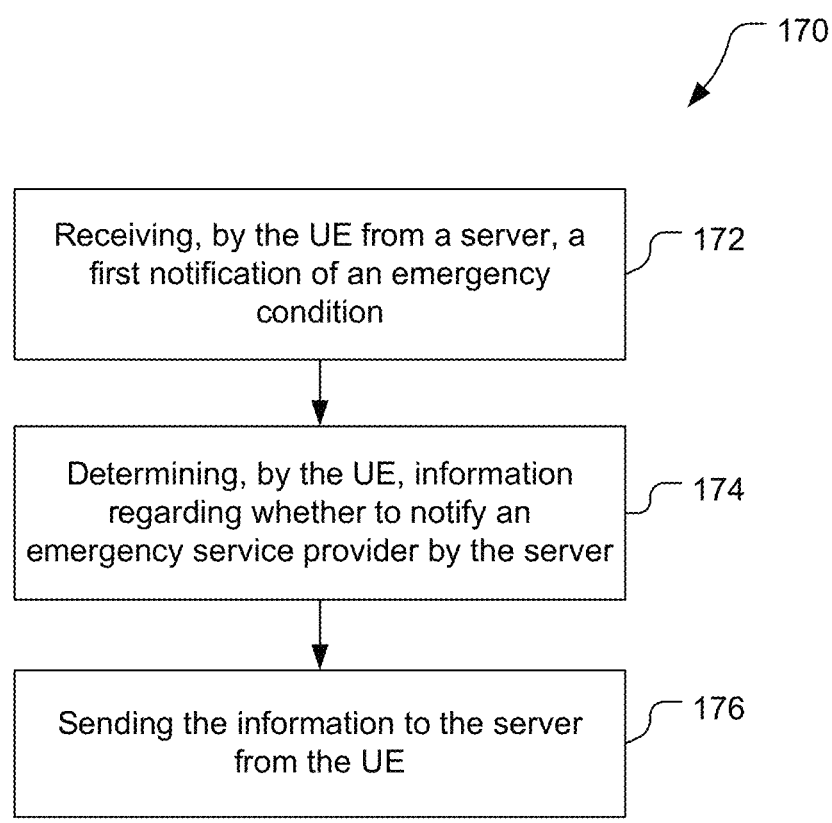
FIG. 6 is a block flow diagram of an example of a method of providing an instruction from a user equipment to an emergency service server to notify an emergency service provider.

FIG. 4 shows an example signaling flow 110 among the ESS 12, the UE 32, the UE 33, the network 18, the location server 22, and the ESP 20 for detecting an emergency condition and providing emergency service according to the techniques described herein. The ESS 12, the UE 32, the UE 33 (and one or more other UEs), the network 18, the location server 22, and the ESP 20 are configured to perform the communications and actions discussed below.

At operation 112 in the signaling flow 110, the ESS 12 detects an emergency condition associated with the structure 14 or associated with one or more users associated with the structure 14. The sensor(s) 50 and/or the processor 40 of the ESS 12 may be configured to detect the emergency condition.

The processor 40 may also or alternatively be configured to detect an emergency condition (or emergency conditions). For example the processor 40 may receive one or more signals from one or more of the sensor(s) 50 indicating that one or more emergency conditions exist. Also or alternatively, the processor 40 may receive one or more raw measurement signals from one or more of the sensor(s) 50 and analyze the raw measurement signal(s) to determine whether one or more emergency conditions exist. Also or alternatively, the processor 40 may receive one or more other raw measurement signals and/or one or more other indications that one or more emergency conditions exist. For example, the processor 40 may receive input through the user interface 46 of a user informing the ESS 12 of an emergency. The input may, for example, be a signal indicating the triggering of a manual fire alarm, text entered through a keyboard and/or a touch-sensitive screen of the user interface 46, audio received by a speaker of the user interface 46, one or more video images captured by a camera of the user interface 46, and/or a signal indicative of the emergency condition as determined by the user interface 46 itself (e.g., by processing text, audio, video, or other input). As another example, the processor 40 may receive, via the transceiver 48, an indication from the UE 32 that an emergency condition exists (and/or may receive one or more other signals from the UE 32 and/or from one or more other UEs). The indication from the UE 32 may be in response to the UE 32 detecting a condition via a sensor of the UE 32 and/or may be in response to input by a user through the user interface 76. As an example, the UE 32 may provide an indication of a medical emergency for a user of the UE 32 as determined by a sensor or sensors worn by or implanted in the user that are in communication with the UE 32.

At operation 113 in the signaling flow 110, the ESS 12 determines one or more UEs to which a notification is to be sent. The processor 40 may be configured to determine which of the UEs 31-35 should be sent the notification, e.g., from a contact list. For example, the processor 40 may be configured to analyze the contact list and select which of the UEs 31-35 to send the notification based on a type of the emergency. The contact list may include one or more indications for each of the UEs 31-35 indicating for which types of emergencies the respective UE should receive a notification. The processor 40 may be configured to select the UE(s) based on one or more criteria such as location(s) of the UE(s), emergency type, time of day, day of week, association of the UE(s) with the structure 14, etc. For example, the processor 40 may be configured to send the notification to the UEs 31-35 that are associated with the structure 14, and this association may change over time (e.g., depending on a location of a UE, programming of the software 44 via the user interface 46, etc.). Also or alternatively, the processor 40 may be configured to use location information for the UEs 31-35, e.g., a last known location for each of the UEs 31-35, to select one or more (or none) of the UEs 31-35 for receiving a notification of the detected emergency condition. For example, if the emergency type requires a user to physically come to the structure 14 within an hour, but a particular UE is hundreds of miles away, then the processor 40 may determine not to select that UE for receiving a notification of the emergency. As another example, the processor 40 may determine not to send a notification to any UE whose last known location is greater than a threshold distance from the structure 14, regardless of the emergency type. As yet another example, the processor 40 may determine which of the UEs 31-35 to send notifications to based on the time of day and/or the day of the week and availability schedules (e.g., normal work hours and work days for users of the UEs for a structure 14 that is an office or factory).

At operation 114 in the signaling flow 110, the ESS 12 sends one or more notifications to the selected UEs from the UEs 31-35, here to the UE 32. The processor 40 may be configured to send one or more notifications, via the transceiver 48, to each of the UEs 31-35 determined at the operation 113, of the one or more emergency conditions and the UEs 31-35 are configured to receive and respond to the notification(s) from the ESS 12. The processor 40 may be configured to send notifications to one or more of the UEs 31-35 in a prioritized order, with the order being based, for example, on the type of emergency, the severity of the emergency, and/or the last-known locations of the UEs 31-35, etc. In the example of FIG. 4, the ESS 12 determined at the operation 113 to send notifications to the UEs 32-33, and thus at the operation 114 the processor 40 sends a notification to the UE 32, but the discussion is applicable to other UEs. The processor 40 can produce and send, via the transceiver 48, a notification indicating the emergency condition to the UE 32. The particular notification may be the same for the UE 32 and for one or more other UEs, or may be different for one or more other UEs that are notified of the emergency, and/or may be sent to one or more other UEs using the same or a different communication protocol (e.g., BLUETOOTH®, Wi-Fi, LTE, etc.) as used for the notification in the operation 114. While FIG. 4 shows the notification being sent directly from the ESS 12 to the UE 32 at operation 114, the notification may be sent via the network 18 in some aspects. The notification may indicate the emergency condition generally, and/or may provide one or more details of the emergency to the UE 32 such as the location of the emergency (e.g., the location of the structure 14 for an emergency condition related to the structure 14 or the location of a UE for an emergency condition related to a user of the UE). The notification may also or instead provide the time the emergency condition was detected (e.g., which may be useful in the event that the user of the UE 32 cannot be notified immediately by the UE 32). For example, which details are provided may depend on the UE or a user associated with the UE (e.g., a medical condition of a parent may not be provided to a mobile phone associated with a pre-teen child). The notification sent by the processor 40 may include an explicit and/or implicit request for location-related information for the UE 32. The request may be implicit, for example, if every emergency condition notification prompts the UE 32 to obtain location-related information, or if the UE 32 determines whether criteria in addition to receiving the notification are met for obtaining the location-related information.

At operation 115 in the signaling flow 110, the UE 32 determines a response, or lack thereof, to the notification sent by the ESS 12 at operation 114. For example, processor 70 of the UE 32 may send a notice to the user of the UE 32 via the user interface 76 corresponding to the received notification and may indicate the emergency type and/or one or more other details regarding the emergency, such as the location of the emergency condition (e.g., the structure 14) and the time the emergency condition was detected. The notice to the user may provide the user with options for responding, e.g., contact police, contact a hospital, contact another UE, contact a general emergency service (e.g., by calling 911 in the United States), etc. The processor 70 may provide information to the user to assist the user in responding to the notification. For example, the processor 70 may interact with the SPS unit 80 to determine a current location of the UE 32 and provide this location on a map to the user. The processor 70 may receive input via the user interface 76 from the user, and behave accordingly. For example, the processor 70 may produce (e.g., create, or access from the memory 72) a responsive message such as an instruction for the ESS 12 to contact the ESP 20 (or any ESP generally), or may determine that no response is to be sent to the ESS 12 (e.g., if explicitly instructed by the user or by passage of a threshold amount of time).

At operation 116 in the signaling flow 110, the UE 32 optionally sends a response to the ESS 12 (e.g., directly or via the network 18). The processor 70 may be configured to send, via the transceiver 78, a communication responsive to the notification received in the operation 114 to the ESS 12. The UE 32 may send an instruction and/or other information (provided by the user or otherwise obtained by the processor 70) to the ESS 12. For example, the user may indicate that the user cannot go to the location of the emergency condition (e.g., the structure 14), or may indicate that the user can go and may also provide the user's estimate of a time of arrival of the user at the location of the emergency condition, etc. Alternatively, the user may provide an instruction to the ESS 12 in the response at operation 116 that the ESS 12 either shall or shall not contact the ESP 20 (e.g., as at operation 126 described later). Further, the processor 70 may determine a response to the notification from the operation 114. For example, the processor 70 may determine a response without querying the user. For example, based on a time of day and a day of week and the emergency type, the processor 70 may determine that the user is unavailable to address the emergency and may produce and send an appropriate (e.g., pre-configured) response to the ESS 12. Further, while labeled a "response," the UE 32 may proactively notify the ESS 12 of one or more conditions affecting the ability of the user of the UE 32 to respond to an emergency, or possibly even to receive the notification at the operation 114. For example, the processor 70 could send a notice to the ESS 12 (e.g., prior to operation 112) that the connectivity status of the UE 32 will prevent receipt of emergency notifications (e.g., the UE 32 is switching to airplane mode or do-not-disturb mode), and for how long, if that information is known (e.g., the user has a scheduled meeting for two hours). Alternatively, the UE 32 may not send a response to the ESS 12 at operation 116, e.g., if the user of the UE 32 in response to the notice provided via the user interface 76 elected not to have the UE 32 send a response to the ESS 12, or if the user failed to elect to have the UE 32 send a response to the ESS 12, or if the UE 32 was powered off when the notification in the operation 114 was sent, etc.

At operation 117 in the signaling flow 110, the ESS 12 sends a notification to the UE 33 (e.g., directly or via the network 18). The operation 117 may be similar to the operation 114 for the UE 32, although the content of the notification in the operation 117 may differ from the content of the notification in the operation 114.

At operation 118 in the signaling flow 110, the UE 33 determines a response to the notification received in the operation 117. In this example, the UE 33 responds to the notification by contacting the location server 22 to request location information for the UE 33 in an operation 119. Examples of the location information include current location, future location, past location, speed, velocity (i.e., speed and direction of travel), direction of movement, or an expected time of arrival at a known location, or a combination thereof, for the UE 33. To determine the current location, the UE 33 may use an SPS unit of the UE 33. Here, the location information is determined by the location server 22 and provided to the UE 33 in an operation 120. For example, the location server 22 may comprise or include a SUPL SLP and may use SUPL to determine the location information. The operation 118 of determining the response includes sending the request at operation 119 and receiving the location information from the location server 22 at operation 120. Some or all of the location information, however, may be calculated by the processor 40 of the ESS 12, and/or by the UE 33, and/or by one or more other devices, in which case operations 119 and 120 may not occur. For example, the UE 33 may obtain location measurements (e.g., measurements of the satellite 16 and/or other satellites and/or measurements of base stations and/or APs in the network 18) and determine a location, velocity, direction of travel etc. for the UE 33 based on the location measurements and without querying location server 22 at operation 119. As another example, a third-party service such as a mapping service may be accessed by the UE 33 and/or by the location server 22 to determine the expected time of arrival for the UE 33 at the location of the emergency condition (e.g., the structure 14) based on the present location of the UE 33, the present direction of travel of the UE 33, a mode of transportation of the UE 33 (e.g., whether the UE 33 is in a motor vehicle, and if so, whether that vehicle is a private conveyance, such as a personal car, or a public conveyance such as a bus), and/or expected travel times of routes between the present location of the UE 33 and the location of the emergency condition. The expected travel times of the routes may depend on, for example, traffic conditions on the routes, public transportation schedules, etc.

At operation 121 in the signaling flow 110, the UE 33 sends a response to the ESS 12. The operation 121 may be similar to the operation 116 for the UE 32, although the content of the response in the operation 121 may differ from the content of the response in the operation 116. For example, the response for operation 121 may include location information for the UE 33 either provided by the location server 22 at operation 120 or determined by the UE 33 as previously described. The response at the operation 121 may not be sent, e.g., if location information for the UE 33 is not obtained (e.g., if the UE 33 was powered off when the notification in the operation 117 was sent), or is not obtained by the UE 33 within a threshold amount of time, or if a user of the UE 33 instructs the UE 33 not to respond to the notification received in the operation 117, etc.

At operations 122-124 in the signaling flow 110, the ESS 12 sends a location request to the location server 22, and the location server 22 determines location information and returns the location information to the ESS 12. At the operation 122, the ESS 12 may send a request for location information to the location server 22 either directly or via the network 18 and without passing through any of the UEs 31-35, The request for location information in the operation 122 may request location information for one or more of the UEs 32-33. The location information requested for different UEs may be different, e.g., the current or last-known location for one UE, and the expected time of arrival of another UE. The requested location information, if determined by the location server 22, is sent by the location server 22 to the ESS 12 in the operation 124. Operations 122-124 are optional and may not occur in some aspects.

At operation 125 in the signaling flow 110, the ESS 12 determines an ESP notification requirement. The ESS 12 may use information obtained regarding the UEs 32-33 to determine a requirement to notify the ESP 20 (or some other ESP), determines which ESP(s) to notify, and determines the content of the notification for the ESP 20.

The processor 40 may determine the requirement to notify an ESP based on one or more criteria. The processor 40 may determine the requirement to notify an ESP by analyzing content of the response(s) from the operation(s) 116, 121, 124, or the lack of such response(s), and may further consider the type of emergency condition including the severity and duration of the emergency condition, the time of day and/or the day of the week. For example, the processor 40 may be configured to determine to notify the ESP 20 if no response is received (e.g., within a threshold interval of time following sending of a notification to the UE(s)) from any UE to which an emergency notification was sent. As another example, the requirement to notify the ESP 20 may have been determined by the UE 32 or the UE 33, and/or by the user of the UE 32 and/or the user of the UE 33, as indicated by instruction(s) in the response 116 and/or the response 121, and at the operation 125 the processor 40 analyzes and acts on the instruction(s) to notify the ESP 20. For example, at the operation 115, the user of the UE 32 may have entered an implicit instruction for ESS 12 to notify the ESP 20 by indicating that the user could not reach the location of the emergency condition (e.g., the structure 14), or may have entered an explicit instruction for ESS 12 to contact the ESP 20 based either on the judgment of the user alone, or based at least partially on information provided or determined by the UE 32 such as a present location of the UE 32 (e.g., determined using the SPS unit 80). As another example, the requirement for the ESS 12 to notify the ESP 20 may be determined by a combination of the UE 32 (and/or the UE 33) and/or the user of the UE 32 (and/or the user of the UE 33), and/or the ESS 12, e.g., using information available to, or provided by, the respective entity and/or information processing by any of these entities. As yet another example, the processor 40 may determine to notify the ESP 20 in response to an emergency arising at a time of day and/or a day of the week when no UE is typically near the structure (e.g., for flooding), or at a time of day and day of week when the emergency likely poses risk of imminent harm (e.g., at 3:00 AM with a high carbon monoxide emergency).

The processor 40 may be configured to determine which ESP(s) to notify based on one or more criteria. For example, the processor 40 may be configured to select the ESP 20 from multiple possible ESPs based on the type of emergency condition and/or information determined for the UE(s) 32-33 such as the location information, and/or a time of day, and/or a day of the week. As an example, the processor 40 may be configured to select the ESP nearest to the location of the emergency condition (e.g., the structure 14) that has capabilities for servicing the type of emergency. As another example, the processor 40 may be configured to select an ESP based on a determined imminent arrival of a user for the UE 32 or the UE 33 at the location of the emergency condition (e.g., the structure 14), but where the user requires certain support from a particular ESP, such as specific equipment or a specific emergency related capability, in order to resolve the emergency condition, As another example, the processor 40 may select an ESP that is further from the location of the emergency condition (e.g., the structure 14) than another, closer, ESP, because the closer ESP is closed at the present time of day or on the present day of the week.

At operations 126-128 in the signaling flow 110, an emergency related session is requested by the ESS 12 and established with the ESP 20 via the network 18. For example, the ESP 20 may be a PSAP, and the processor 40 may be configured to establish, via the transceiver 48, an emergency call with the PSAP. As another example, the ESP 20 may be a private emergency provider and the ESS 12 may request and establish a data session, voice session and/or a session for other media (e.g., text or video) with the ESP 20 via the network 18, where the session may not be seen as an emergency session by the network 18. At the operation 126, having chosen the ESP 20, the ESS 12 sends a request for an emergency related session with the ESP 20 to the network 18 for relay/forwarding to the ESP 20 at operation 127. At operation 128, the ESP 20 responds to receiving the request for the emergency related session by sending an emergency related session response message to the ESS 12 (via the network 18 as appropriate) to establish an emergency related service session between the ESS 12 and the ESP 20. The ESS 12 may, for example, be configured to relay an emergency related request message from a user of the UE 32 and/or to provide the ESP 20 with a prepared emergency request, e.g., based on the emergency type and/or emergency location.

With further reference to FIGS. 1-4, FIG. 5 shows a flow chart of a method 150 of supporting emergency services at a server includes the stages shown. The method 150 is, however, an example only and not limiting. The method 150 may be altered, e.g., by having stages added, removed, rearranged, combined, performed concurrently, and/or having single stages split into multiple stages. In an aspect, the server is an ESS (e.g., the ESS 12).

At stage 152, the method 150 includes detecting an emergency condition. For example, the server (e.g., the ESS 12) may detect an emergency condition as discussed with respect to the operation 112 of FIG. 4, e.g., by one or more of the sensor(s) 50 detecting and indicating an emergency or by providing information from which the processor 40 determines that an emergency exists. The emergency condition may be an emergency condition for a least one of a person, an animal, a home, a building, an office, a factory, a venue, or a vehicle. The emergency condition may comprise at least one of a fire, a medical condition, a burglary, or a flood.

At stage 154, the method 150 includes sending a first notification of the emergency condition to at least one mobile device. For example, the server may send one or more notifications to one or more of the UEs 31-35, such as the UEs 32-33, as discussed with respect to the operations 114 and 117 of FIG. 4.

At stage 156, the method 150 includes determining information for the at least one mobile device. For example, the server (e.g., the processor 40 for the ESS 12) may determine information directly for one or more of the UEs 31-35, and/or by receiving information from the one or more UEs 31-35, the location server 22, and/or one or more other devices regarding the one or more UEs 31-35, for example as discussed with respect to the operations 114-124 of FIG. 4. For example, the information determined may comprise location information, and the location information may comprise: a current location of the at least one mobile device, a future location of the at least one mobile device, a past location of the at least one mobile device, a speed of the at least one mobile device, a velocity of the at least one mobile device, a direction of movement of the at least one mobile device, or an expected time of the at least one mobile device at a known location, or a combination thereof. Also or alternatively, determining the information may comprise determining an absence of a response from the at least one mobile device for a threshold interval of time following sending the first notification At stage 158, the method includes determining a requirement to notify an emergency service provider based, at least in part, on the information for the at least one mobile device. For example, the processor 40 of the ESS 12 may determine whether to notify the ESP 20 as discussed with respect to the operation 125 of FIG. 4. The requirement to notify the emergency service provider may be determined by the at least one mobile device or the user of the at least one mobile device, or a combination thereof.

At stage 160, the method includes sending a second notification of the emergency condition to the emergency service provider in response to the requirement to notify the emergency service provider being determined. For example, the ESS 12 may send a request for an emergency related session as discussed with respect to the operation 126 of FIG. 4. The emergency service provider may be a public safety answering point (PSAP), and sending the second notification of the emergency condition to the emergency service provider may comprise establishing an emergency call with the PSAP.

The method 150 may include one or more further features. For example, the method 150 may further include receiving a response from a user of the at least one mobile device, e.g., as discussed with respect to the operations 115-116 of FIG. 4. The information determined at stage 156 may comprise the response. Also or alternatively, the response may comprise the requirement to notify the emergency service provider (e.g., which may be determined by the at least one mobile device or by the user of the at least one mobile device). Also or alternatively, the method 150 may include determining the at least one mobile device, from among multiple mobile devices, based at least in part on the emergency condition. Also or alternatively, the method 150 may include determining the emergency service provider based, at least in part, on at least one of the emergency condition or the information for the at least one mobile device. Also or alternatively, the at least one mobile device, the emergency service provider, or the requirement to notify the emergency service provider, or a combination thereof, may be determined based, at least in part, on at least one of a time of day or a day of week.

With further reference to FIGS. 1-5, FIG. 6 shows a flow chart of a method 170 of supporting emergency services by a user equipment (UE) and includes the stages shown. The method 170 is, however, an example only and not limiting. The method 170 may be altered, e.g., by having stages added, removed, rearranged, combined, performed concurrently, and/or having single stages split into multiple stages. The UE may correspond to any of the UEs 31-35 in FIG. 1—e.g., the UE 32 or the UE 33.

At stage 172, the method 170 includes receiving, by the UE from a server, a first notification of an emergency condition. In an aspect, the server is an ESS (e.g., ESS 12). For example, the UE 32 may receive an emergency condition notification from the ESS 12 as discussed with respect to the operation 114 of FIG. 4 and/or the UE 33 may receive an emergency condition notification from the ESS 12 as discussed with respect to the operation 117 of FIG. 4.

At stage 174, the method 170 includes determining, by the UE, information regarding whether to notify an emergency service provider by the server. For example, the UE 32 may determine information as discussed with respect to the operation 115 of FIG. 4 and/or the UE 33 may determine information as discussed with respect to the operation 118 of FIG. 4. The information may comprise location information for the mobile device. The location information may comprise at least one of a current location of the mobile device, a future location of the mobile device, a past location of the mobile device, a speed of the mobile device, a velocity of the mobile device, a direction of movement of the mobile device, or an expected time of arrival of the mobile device at a known location. Also or alternatively, the information may comprise a requirement for notifying the emergency service provider.

At stage 176, the method 170 includes sending the information to the server from the UE. For example, the UE 32 may send information in a response to the ESS 12 as discussed with respect to the operation 116 of FIG. 4 and/or the UE 33 may send information in a response as discussed with respect to the operation 121 of FIG. 4.

The method 170 may include one or more further features. For example, the method 170 may include: providing a second notification of the emergency condition, based on the first notification of the emergency condition, to a user of the mobile device; and receiving a response from the user, wherein the information is based, at least in part, on the response. For example, the processor 70 may provide a notice regarding the emergency condition to a user of the UE 32 through the user interface 76, and the processor 70 may receive a response from the user via the user interface 76, e.g., as discussed with respect to the operation 115 of FIG. 4.

Other Considerations

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

A description that an entity produces an item, such as a message, does not require the entity to generate the item from scratch. For example, an emergency notification produced and sent by the ESS 12 to a UE, and/or a request for an emergency related session produced and sent by the ESS 12 to the ESP 20, may be accessed from the memory 72.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions.

The processes, systems, and devices discussed above are examples, and as such are not limiting of the claims or the invention(s) as a whole. Various configurations may omit, substitute, or add various procedures or components as appropriate. For instance, in alternative configurations, the processes may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method of supporting emergency services at a server, the method comprising:
   detecting an emergency condition;
   determining at least one mobile device from a plurality of mobile device to notify based on an emergency type associated with the emergency condition and a location associated with each mobile device;

sending, from the server, a notification of the emergency condition to the at least one mobile device, wherein the notification indicates options for responding to the emergency condition by the at least one mobile device; and receiving, from the at least one mobile device, a response indicating whether a user will go to a location associated with the emergency condition, wherein the response is based on at least one option from the options provided in the notification.

2. The method of claim 1, wherein the location associated with each mobile device comprising: a current location, a future location, a past location, a speed, a direction of movement, or an expected time of arrival at a known location, or any combination thereof.

3. The method of claim 1, further comprising:
determining an emergency service provider based on the emergency condition; and
wherein the notification includes the emergency service provider.

4. The method of claim 1, wherein the determining at least one mobile device from a plurality of mobile devices is further based on a time of day or a day of week.

5. A server comprising:
a transceiver;
a processor communicatively coupled to the transceiver and configured to:
detect an emergency condition;
determine at least one mobile device from a plurality of mobile device to notify based on an emergency type associated with the emergency condition and a location associated with each mobile device;
send, via the transceiver, a notification of the emergency condition to the at least one mobile device, wherein the notification indicates options for responding to the emergency condition by the at least one mobile device; and
receive, via the transceiver, from the at least one mobile device, a response indicating whether a user will go to a location associated with the emergency condition, wherein the response is based on at least one option from the options provided in the notification.

6. The server of claim 5, wherein the location associated with each mobile device comprising: a current location, a future location, a past location, a speed, a direction of movement, or an expected time of arrival at a known location, or any combination thereof.

7. The server of claim 5, wherein the processor is further configured to:
determine an emergency service provider based on the emergency condition; and
wherein the notification includes the emergency service provider.

8. The server of claim 5, wherein the processor is configured to determine at least one mobile device from a plurality of mobile devices is further based on a time of day or a day of week.

9. A server comprising:
means for detecting an emergency condition;
means for determining at least one mobile device from a plurality of mobile device to notify based on an emergency type associated with the emergency condition and a location associated with each mobile device;
means for sending a notification of the emergency condition to the at least one mobile device, wherein the notification indicates options for responding to the emergency condition by the at least one mobile device; and
means for receiving, from the at least one mobile device, a response indicating whether a user will go to a location associated with the emergency condition, wherein the response is based on at least one option from the options provided in the notification.

10. The server of claim 9, wherein the location associated with each mobile device comprising: a current location, a future location, a past location, a speed, a direction of movement, or an expected time of arrival at a known location, or any combination thereof.

11. The server of claim 9, further comprising means for determining an emergency service provider based on the emergency condition; and
wherein the notification includes the emergency service provider.

12. The server of claim 9, the means for determining the at least one mobile device from the plurality of mobile device is further based on a time of day or a day of week.

* * * * *